US012360796B2

(12) United States Patent
Ramaswamy et al.

(10) Patent No.: US 12,360,796 B2
(45) Date of Patent: Jul. 15, 2025

(54) MANAGING UPDATES ON VIRTUAL MACHINE SYSTEMS

(71) Applicant: Microsoft Technology Licensing, LLC, Redmond, WA (US)

(72) Inventors: Govind Ramaswamy, Lynnwood, WA (US); Murali Mohan Chintalapati, Bellevue, WA (US); Yingnong Dang, Sammamish, WA (US); Daniele Maso, Redmond, WA (US); Pritesh Patwa, Redmond, WA (US); Najam Shahid, Redmond, WA (US); Ravikiran Janardhan Reddy, Bothell, WA (US); Arun Kishan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 525 days.

(21) Appl. No.: 17/752,782

(22) Filed: May 24, 2022

(65) Prior Publication Data

US 2023/0385091 A1 Nov. 30, 2023

(51) Int. Cl.
G06F 9/455 (2018.01)
G06F 8/65 (2018.01)

(52) U.S. Cl.
CPC ............ *G06F 9/45558* (2013.01); *G06F 8/65* (2013.01); *G06F 2009/4557* (2013.01); *G06F 2009/45583* (2013.01); *G06F 2009/45595* (2013.01)

(58) Field of Classification Search
CPC .................................................. G06F 9/45558
USPC .......................................................... 718/1
See application file for complete search history.

(56) References Cited

U.S. PATENT DOCUMENTS

| | | | |
|---|---|---|---|
| 9,641,406 B1* | 5/2017 | Allen .................. | G06F 8/65 |
| 9,841,988 B1* | 12/2017 | Magnezi ............. | H04L 67/34 |
| 9,996,381 B1* | 6/2018 | Raju .................... | G06F 9/45558 |
| 10,296,318 B2* | 5/2019 | Antony ............... | G06F 9/45558 |
| 11,768,672 B1* | 9/2023 | Silakov .............. | G06F 8/65 |
| | | | 717/172 |
| 2003/0163551 A1* | 8/2003 | Riordan ............. | H04L 63/0442 |
| | | | 709/219 |
| 2009/0007105 A1* | 1/2009 | Fries .................. | G06F 8/65 |
| | | | 718/1 |

(Continued)

OTHER PUBLICATIONS

"International Search Report and Written Opinion Issued in PCT Application No. PCT/US23/016785", Mailed Date: Jul. 7, 2023, 11 Pages.

*Primary Examiner* — Mehran Kamran
(74) *Attorney, Agent, or Firm* — Ray Quinney & Nebeker; James Bullough

(57) ABSTRACT

The present disclosure relates to systems, methods, and computer-readable media for determining optimal index configurations for intelligently managing updates of virtual machines in an offline manner in a cloud computing system. For instance, a virtual machine (VM) update system can efficiently determine when to apply updates to virtual machines in an intelligent manner that prevents the updates from interfering with the deallocation of virtual machines. In addition, the VM update system can utilize the operating system (OS) disk image snapshots to automatically provide safeguards and ensure that updates do not degrade the performance of the virtual machines, or in the case of an update failure, that the virtual machines are restored to their previous state without the data loss.

20 Claims, 11 Drawing Sheets

(56) References Cited

U.S. PATENT DOCUMENTS

| | | | |
|---|---|---|---|
| 2009/0113413 A1* | 4/2009 | Reinz | G16H 40/40 717/173 |
| 2009/0320014 A1* | 12/2009 | Sudhakar | G06F 9/45533 717/169 |
| 2011/0265076 A1* | 10/2011 | Thorat | G06F 9/45533 718/1 |
| 2012/0174095 A1* | 7/2012 | Natchadalingam | G06F 8/65 718/1 |
| 2013/0036328 A1* | 2/2013 | Mutisya | G06F 8/65 717/172 |
| 2013/0227089 A1* | 8/2013 | McLeod | G06F 9/45558 709/220 |
| 2013/0339949 A1* | 12/2013 | Spiers | G06F 9/45558 718/1 |
| 2014/0123122 A1* | 5/2014 | Dhanyamraju | G06F 8/65 717/168 |
| 2014/0189677 A1* | 7/2014 | Curzi | G06F 8/65 717/171 |
| 2014/0208314 A1* | 7/2014 | Jeswani | G06F 9/45533 718/1 |
| 2014/0229939 A1* | 8/2014 | Dias de Assuncao | G06F 8/65 718/1 |
| 2014/0366018 A1* | 12/2014 | Spradlin | G06F 9/45533 718/1 |
| 2015/0081910 A1* | 3/2015 | Assuncao | H04L 67/34 709/226 |
| 2015/0177997 A1* | 6/2015 | Warszawski | G06F 9/45558 711/162 |
| 2016/0224364 A1* | 8/2016 | Herrendoerfer | G06F 9/45558 |
| 2016/0378456 A1* | 12/2016 | Chai | H04L 67/34 717/169 |
| 2017/0272337 A1* | 9/2017 | Allen | G06F 8/65 |
| 2017/0300386 A1* | 10/2017 | Shulga | G06F 11/1438 |
| 2018/0232253 A1* | 8/2018 | Michimura | G06F 9/4881 |
| 2018/0260207 A1* | 9/2018 | Dias de Assuncao | G06F 8/65 |
| 2018/0260237 A1* | 9/2018 | Noll | G06F 11/1446 |
| 2018/0336055 A1* | 11/2018 | Bernardini | G06F 9/45558 |
| 2019/0045000 A1* | 2/2019 | Hiremath | H04L 49/501 |
| 2019/0163460 A1* | 5/2019 | Kludy | G06F 9/00 |
| 2020/0021648 A1* | 1/2020 | Radev | H04L 67/56 |
| 2020/0169837 A1* | 5/2020 | Iqbal | H04W 4/021 |
| 2021/0004000 A1* | 1/2021 | Kalaskar | G06F 9/45545 |
| 2021/0117377 A1* | 4/2021 | Savir | G06F 16/178 |
| 2021/0406052 A1* | 12/2021 | Shpilyuck | G06F 9/45558 |
| 2022/0350628 A1* | 11/2022 | Parry-Barwick | G06F 9/44505 |
| 2023/0221973 A1* | 7/2023 | Sethi | G06F 8/65 718/1 |
| 2023/0229523 A1* | 7/2023 | Simeonov | G06F 9/4856 718/105 |
| 2023/0385091 A1* | 11/2023 | Ramaswamy | G06F 9/45558 |

* cited by examiner

MANAGING UPDATES ON VIRTUAL MACHINE SYSTEMS

BACKGROUND

Recent years have seen significant advancements in hardware and software platforms that implement cloud computing systems. Cloud computing systems often make use of different types of virtual services (e.g., virtual machines, computing containers, packages, etc.) that provide computing functionality and remote storage to various clients or customers. These virtual services can be hosted by respective server nodes on a cloud computing system, such as in a datacenter of servers and/or on computing devices in other locations.

Despite advances in the area of cloud computing, current cloud computing systems face several technical shortcomings that result in inefficient, inaccurate, and inflexible operations, particularly in the areas of virtual machine upgrade management. For example, virtual machines regularly update to fix bugs, deliver improved features, and provide up-to-date security protections. During updates, virtual machines are often prevented from stopping and deallocating their assigned computing resources. As a result, these virtual machines must wait for the updates to complete before properly deallocating, which can take some amount of time. This added wait time imposes inefficiencies by rigidly tying up computing resources and requiring computing devices to sustain allocated resources for virtual machines that are being updated. Indeed, as seen, these conventional cloud computing systems lack a deep native integration between cloud virtual machines and the lifecycles of operating systems on these virtual machines.

As an alternative to waiting for an update to complete, some users perform a hard or non-graceful shutdown. Often, a hard shutdown corrupts a virtual machine and requires a lengthy boot and/or restoration process to an outdated state when the virtual machine is next allocated. Additionally, when a virtual machine is corrupted, user and/or system data is often lost, resulting in inaccuracies.

Some conventional systems attempt to solve some of the above issues by allowing for user-initiated system backups. For example, a user manually indicates that a system restores point be created before an update. This option for user-initiated system backups is rigidly limited to specific versions of operating systems while the problems described above can occur across all virtual machine operating systems. Further, these user-initiated system backups are themselves time-consuming and are occasionally unreliable as a backup.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
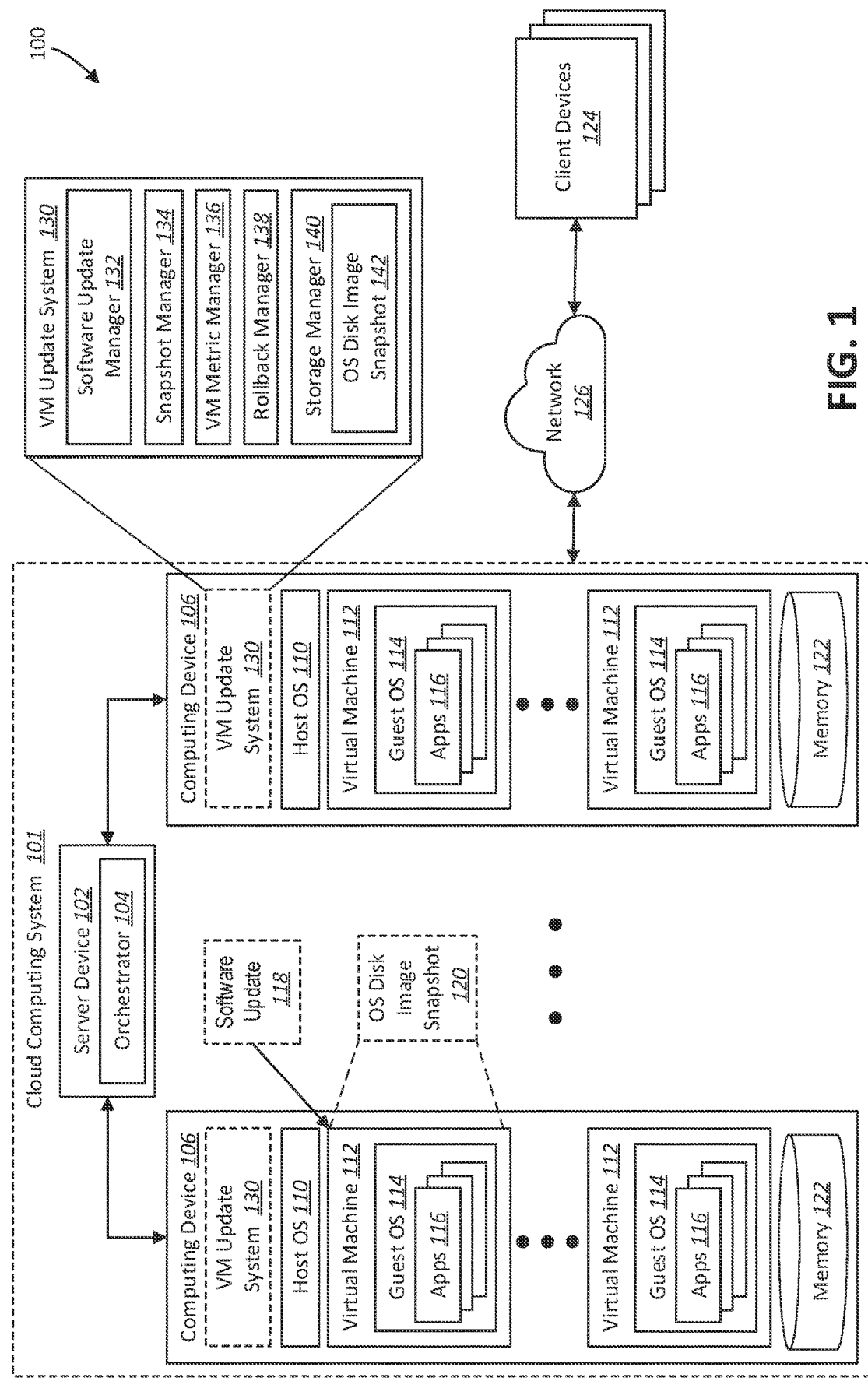
FIG. 1 illustrates a diagram of a computing system environment including a virtual machine (VM) update system having virtual machines in accordance with one or more implementations.

Implementations of the present disclosure provide benefits and/or solve one or more of the foregoing or other problems in the art with systems, non-transitory computer-readable media, and methods that intelligently manage updates of virtual machines offline in a cloud computing system. For instance, a virtual machine (VM) update system can efficiently determine when to apply updates to virtual machines in an intelligent manner that prevents software updates from interfering with the deallocation of virtual machines. In addition, the VM update system utilizes operating system (OS) disk image snapshots to automatically provide safeguards and ensure that updates do not degrade the performance of the virtual machines, or in the case of an update failure, that the virtual machines are restored to their previous state without the loss of data.

To illustrate, in one or more implementations, the VM update system detects a software update available for a virtual machine on a host device. In response, the VM update system can generate a snapshot of an OS disk image of the virtual machine. In addition, the VM update system can utilize a machine-learning model to determine an offline update time and update the virtual machine with the software update at the offline update time. Further, the VM update system can determine whether the update of the virtual machine satisfies one or more update metrics. If so, the VM update system can resume the operation of the virtual machine by redirecting incoming network traffic to the updated virtual machine. Otherwise, if the update metrics are not satisfied, the VM update system can roll back the virtual machine to a previous state based on the snapshot of the operating system disk image of the virtual machine.

As provided below, compared to conventional systems, the VM update system disclosed herein provides several technical benefits in terms of computing efficiency, accuracy, and flexibility. Indeed, the VM update system provides several practical applications that deliver benefits and/or solve problems associated with updating virtual machines.

To illustrate, the VM update system generates and utilizes a machine-learning model to determine an optimal offline update time when a virtual machine and/or its host device will be available for a detected software update. In some implementations, the VM update system utilizes the machine-learning model to determine the offline update time based on various activity signals and update length data. In this manner, the virtual machine is not left waiting for a software update to complete before being deallocated, which results in a reduction in computing cost and wasted resources.

As another example of improved computer efficiency, in one or more implementations, the VM update system advantageously notifies users of a software update to a compute instance type. For context, a compute instance type includes upgradable software or hardware components on a computing device that hosts a virtual machine. For example, a compute instance type includes a host operating system (OS), a guest OS of a virtual machine (WM), a computing container, a package, an agent, etc. By notifying the user of the software update, the VM update system allows the user to confirm or modify the planned offline software update. Further, the VM update system can additionally learn (e.g., tune the machine-learning model) from feedback to the notification.

As an additional example of improved computer efficiency, in various implementations, the VM update system utilizes a captured snapshot of the operating system disk image of the virtual machine to efficiently roll back a virtual machine (or other compute instance type). For instance, the VM update system monitors updates to a virtual machine and determines when an update fails or degrades the operational effectiveness of the virtual machine. In these cases, the VM update system utilizes the snapshot to roll back the virtual machine to a recently stable state. Additionally, because the VM update system performs these operations outside of the virtual machine being deallocated, allocated computing resources are not lost or wasted while waiting for an OS to first update.

The VM update system also provides improved accuracy over conventional cloud computing systems. For example, the VM update system prepares the virtual machine to reach a state before capturing a snapshot of the operating system disk image. For instance, the VM update system can cordon and drain the virtual machine and/or redirect network traffic to another active virtual machine. Once the virtual machine is prepared, the VM update system can capture a snapshot of the disk image of the virtual machine. Indeed, the VM update system can capture a virtual machine disk image snapshot without capturing data in volatile memory associated with the virtual machine. In this manner, in the case of a rollback, the VM update system can accurately restore the virtual machine (or other compute instance type) to a last or recent active state without the loss of any data.

As an additional example of improved computer accuracy, in various implementations, the VM update system determines that a virtual machine satisfies one or more performance update metrics before re-allocating the virtual machine. For instance, while the virtual machine may appear to have successfully updated, the software update may degrade the operation of the guest OS or an app on the virtual machine. In some implementations, the VM update system monitors the virtual machine for a time period or window to ensure the virtual machine meets or exceeds performance update metrics taken before the software update (or at least satisfies a minimal operational threshold).

As a further example of improved computer accuracy, in some implementations, the VM update system performs rollbacks based on system granularity levels. For example, if the software update is for a computing container, the VM update system can roll back the computing container using a computing container disk image snapshot. Likewise, the VM update system can roll back based on the different levels of compute instance types. In this manner, the VM update system can roll back only a portion of the virtual machine and/or host device without affecting or hindering the other portions.

The VM update system also provides improved flexibility over conventional systems. For example, the VM update system provides an OS-agnostic solution. Unlike conventional cloud computing systems, the VM update system quickly works for virtual machines across all operating systems and versions. Further, the VM update system allows for a guest OS to capture a virtual machine snapshot (e.g., an internal operation) or the host OS to capture the virtual machine snapshot (e.g., an external operation). Additionally, as noted above, in various implementations, the VM update system can flexibly target specific computing instance types of a virtual machine and/or host device. Moreover, the VM update system provides enhanced integration for managing components of a cloud computing system, including guest operating systems on virtual machines running on server devices within the cloud computing system.

As illustrated in the foregoing discussion, the present disclosure utilizes a variety of terms to describe the features and advantages of one or more implementations described herein. For instance, as used herein, a "cloud computing system" refers to a network of connected computing devices that provide various services to client devices. For instance, a cloud computing system can be a distributed computing system that includes a collection of physical server devices (e.g., server nodes) organized in a hierarchical structure including computing zones, clusters, virtual local area networks (VLANs), racks, load balancers, fault domains, etc. In addition, features and functionality described in connection with cloud computing systems can similarly relate to racks, fault domains, or other hierarchical structures of physical server devices. The cloud computing system may refer to a private or public cloud computing system.

In some implementations, a cloud computing system includes an orchestrator that manages servers, server clusters, server racks, server nodes, and/or other server groups of computing devices. A server device can be called a "host device" and include a host operating system (host OS), one or more virtual machines. In addition, a server device can include memory and other computing components, such as an agent and/or hypervisor.

As used herein, a "virtual machine" refers to an emulation of a computer system on a server node that provides the functionality of one or more applications on the cloud computing system. In various implementations, a host device allocates computing cores and/or memory to virtual machines running on the host device. Virtual machines can provide the functionality needed to execute one or more operating systems. In addition, virtual machines can utilize hypervisors on processors of server devices that support virtual replication of hardware. In some implementations, a virtual machine includes a guest operating system (guest OS) that performs functions requested by an entity (e.g., the guest) as well as various virtual applications. Stated another way, a guest OS is a customer-controlled entity that runs on one of the host nodes. It will be understood that while specific examples and implementations features and functionality described herein with respect to virtual machines can likewise apply groups of virtual machines and/or compute instance types.

As used herein, the term "compute instance type" refers to a portion of a server device that is upgradable. Often, a compute instance type refers to a software component of the server device. Some instances of a compute instance type are device-level instances, such as the host OS and a host agent. Other instances of a compute instance type at a virtual machine level, such as the guest OS, applications, applications, computing containers, packages, agents, etc.

As used herein, an "application" or simply ("app") refers to a virtual service provided by a cloud computing system. An application may be implemented on a virtual machine having a guest OS and provide various functions, features, services, etc. to clients or customers accessing the virtual machine. Similarly, as used herein, a "computing container," "container image," or "virtual computing container" refers to a virtual service or layer on a server device of a cloud computing system that provides access to a storage space and/or software application hosted by the cloud computing system. Computing containers can provide services to any number of containerized applications on a cloud computing system.

As used herein, a "snapshot" refers to capturing a state and/or stable content of a disk at a particular time. For example, a snapshot records an image (e.g., an operating system disk image) of a guest OS, application, computing container, or other compute instance type at a specific time instance. In many implementations, a snapshot captures the disk image without capturing data stored in memory (e.g., volatile memory). In some implementations, a snapshot is captured by changing permissions for a disk to read-only and/or copy-on-write. A snapshot may be initiated by a virtual machine (e.g., guest OS), a host device (e.g., a host OS), and/or the cloud computing system (e.g., an orchestrator).

As used herein, the term "machine-learning model" refers to a computer model or computer representation that can be tuned (e.g., trained) based on inputs to approximate unknown functions. For instance, a machine-learning model can include, but is not limited to, a transformer model, a sequence-to-sequence model, a natural language processing (NLP) model, a neural network (e.g., a convolutional neural network or deep learning model), a decision tree (e.g., a gradient boosted decision tree), a linear regression model, a logistic regression model, a random forest model, a clustering model, association rule learning, inductive logic programming, support vector learning, Bayesian network, regression-based model, principal component analysis, or a combination thereof.

As used herein, an "offline update time" refers to a time or time range when a compute instance type is idle, deallocated, down, and/or otherwise available for a software update. For example, an offline update time can include a time window when one or more virtual machines on a host device are deallocated and offline. As another example, an offline update time can include a specific time. In various implementations, the VM update system utilizes a machine-learning model to determine an offline update time for a compute instance type.

As used herein, an "update metrics" refers to one or more measurements, factors, or capacities for evaluating the functions and features of a compute instance type. For example, one example of an update metric is whether a virtual machine can boot, establish connections, and run applications. Another example is determining if functions of a recently updated virtual machine meet, exceed, or are within a threshold level of the virtual machine pre-update. In some instances, the update metrics include an application or computing container performing internal performance measurements and verifications. Further, in one or more instances, the VM update system monitors the update metrics at the beginning, during, and/or at the end of a period of time (e.g., a time window).

Additional detail will now be provided regarding the VM update system for improving the management of updating compute instance types such as virtual machines. For example, FIG. 1 illustrates a schematic diagram of an environment 100 (i.e., a digital medium system environment) for implementing a VM update system 130. As shown, FIG. 1 includes a cloud computing system 101 and client devices 124 connected via a network 126.

As shown, the cloud computing system 101 includes a server device 102 and computing devices 106. The server device 102 includes an orchestrator 104 that can manage various functions within the cloud computing system 101, such as overseeing allocations, directing incoming network traffic to virtual machines, and/or otherwise managing operations within the cloud computing system 101. In various implementations, the orchestrator 104 includes control plane components. Also, while one instance of the server device 102 is shown, in various implementations, the server device 102 can represent multiple server devices and/or other computing devices.

As mentioned, the cloud computing system 101 includes multiple instances of the computing devices 106. The computing devices can be part of a cluster, such as a node cluster having multiple server nodes (e.g., computing devices). As shown, each of the computing devices 106 includes the VM update system 130, a host OS 110, virtual machines 112, and memory 122. In some instances, the computing devices 106 also include a hypervisor (e.g., cloud hosting software). In various implementations, the host OS 110 provides operating system (OS) functions for a computing device. For example, the host OS facilitates allocating computing cores on a computing device to implement a virtual machine.

As shown, each of the virtual machines 112 can include a guest OS 114 and apps 116 (i.e., applications). In one or more implementations, the virtual machines 112 correspond to one or more customers (e.g., guests) and provide access to storage space (e.g., memory 122) and/or applications (e.g., apps 116) hosted by the computing devices 106. For example, a virtual machine may provide access to a large-scale computation application to a client device (or multiple client devices 124). As another example, a different virtual machine on the same computing device (e.g., server node) or a different computing device may provide access to a gaming application to a second client device. Additional detail regarding the guest OS 114 and the apps 116 are provided below.

As further shown, the environment 100 includes a plurality of client devices 124 in communication with the cloud computing system 101 (e.g., in communication with the computing devices 106) via the network 126. The client devices 124 may refer to various types of computing devices including, by way of example, mobile devices, desktop computers, or other types of computing devices. In addition, the network 126 may include one or multiple networks that use one or more communication platforms or technologies for transmitting data. For example, the network 126 may include the Internet or other data link that enables the transport of electronic data between respective client devices and devices of the cloud computing system 101. Additional detail regarding these computing devices and networks is provided below in connection with FIG. 11.

While FIG. 1 illustrates a specific arrangement of computing devices 106 and virtual machines 112, the cloud computing system 101 can include any number of node clusters (or other hierarchical structure of devices), which may include any number of computing devices, each of which may include zero, one, or multiple virtual machines, computing containers and/or other types of virtual services implemented thereon.

Returning to the VM update system 130, in various implementations, the VM update system 130 facilitates updating virtual machines (including virtual machine components and/or virtual machine environments (e.g., the host device)) in an efficient manner that does not require waiting for a virtual machine to deallocate and without losing data or performance. As described below, in one or more implementations, the VM update system 130 utilizes machine-learning models to determine an optimal offline update time for a virtual machine based on a software update 118 that is pending. In addition, the VM update system 130 can create an OS disk image snapshot 120 of the virtual machine at a stable state, perform the software update, verify the update and virtual machine performance, and reactivate the updated virtual machine.

As shown the VM update system 130 resides on a computing device. For example, each of the computing devices 106 includes a VM update system 130. In some implementations, some or all of the VM update system 130 is implemented within one or more of the virtual machines 112. For instance, in some implementations, each virtual machine includes a VM update system 130.

In some implementations, the VM update system 130 (some or all) is located external to the computing devices, such as on the server device 102 and/or as part of the cloud computing system 101. For instance, when some or all of the VM update system 130 is located on the server device 102, the VM update system 130 can coordinate software updates across multiple virtual machines 112. For example, the VM update system 130 ensures that not all virtual machines belonging to an entity update at the same time and/or that a backup virtual machine does not update white a corresponding primary virtual machine updates. Further, the VM update system 130 can track the progress of updates across similar and/or different virtual machines, as mentioned below.

As shown in the expanded box on the top right of FIG. 1, the VM update system 130 can include various components. To illustrate, the VM update system 130 includes a software update manager 132, a snapshot manager 134, a VM metric manager 136, a rollback manager 138, and a storage manager 140 having the OS disk image snapshot 120. In example implementations, one or more of the components are located on a separate device and/or separate from other components of the VM update system 130. For instance, the snapshot disk image 142 is stored in the network 126 and/or separately from a virtual machine.

As shown, the VM update system 130 includes the software update manager 132. In various implementations, the software update manager 132 receives, accesses, provides, edits, modifies, identifies, creates, or otherwise manages software updates. For example, the software update manager 132 receives and/or detects a software update 118 for a virtual machine. In response, the software update manager 132 can provide a notification of the software update and/or determine the offline update time of when to perform the update, as detailed below.

As shown, the VM update system 130 includes the snapshot manager 134. The snapshot manager 134 creates, facilitates, stores, identifies, accesses, edits, modifies, stores, or otherwise manages OS disk image snapshots. For example, before updating a virtual machine, the snapshot manager 134 generates an OS disk image snapshot 120 (e.g., a snapshot disk image) of the virtual machine, as further described below.

As shown, the VM update system 130 includes the VM metric manager 136. The VM metric manager 136 measures, tests, monitors, evaluates, identifies, accesses, stores, compares, or otherwise manages performance metrics of a virtual machine. For example, in various implementations, upon performing a software update, the VM metric manager 136 determines whether the update was completed successfully as well as if the virtual machine satisfies one or more performance update metrics, as further described below.

As shown, the VM update system 130 includes the rollback manager 138. In various implementations, the rollback manager 138 performs or otherwise manages software rollbacks on the virtual machines 112. For example, when the software update 118 fails to update or fails to satisfy one or more performance update metrics, the rollback manager 138 utilizes the OS disk image snapshot 120 to roll back the virtual machine to a previously known stable state, as detailed below.

Additionally, the VM update system 130 includes the storage manager 140. In various implementations, the storage manager 140 can include any data used by any of the components of the VM update system 130 in performing features and functionality described herein. For example, the storage manager 140 may include an OS disk image snapshot 120 for a virtual machine being updated. In some implementations, the storage manager 140 assists in removing or deleting the OS disk image snapshot 120 upon a virtual machine successfully updating and/or being reactivated.

Figure 2:
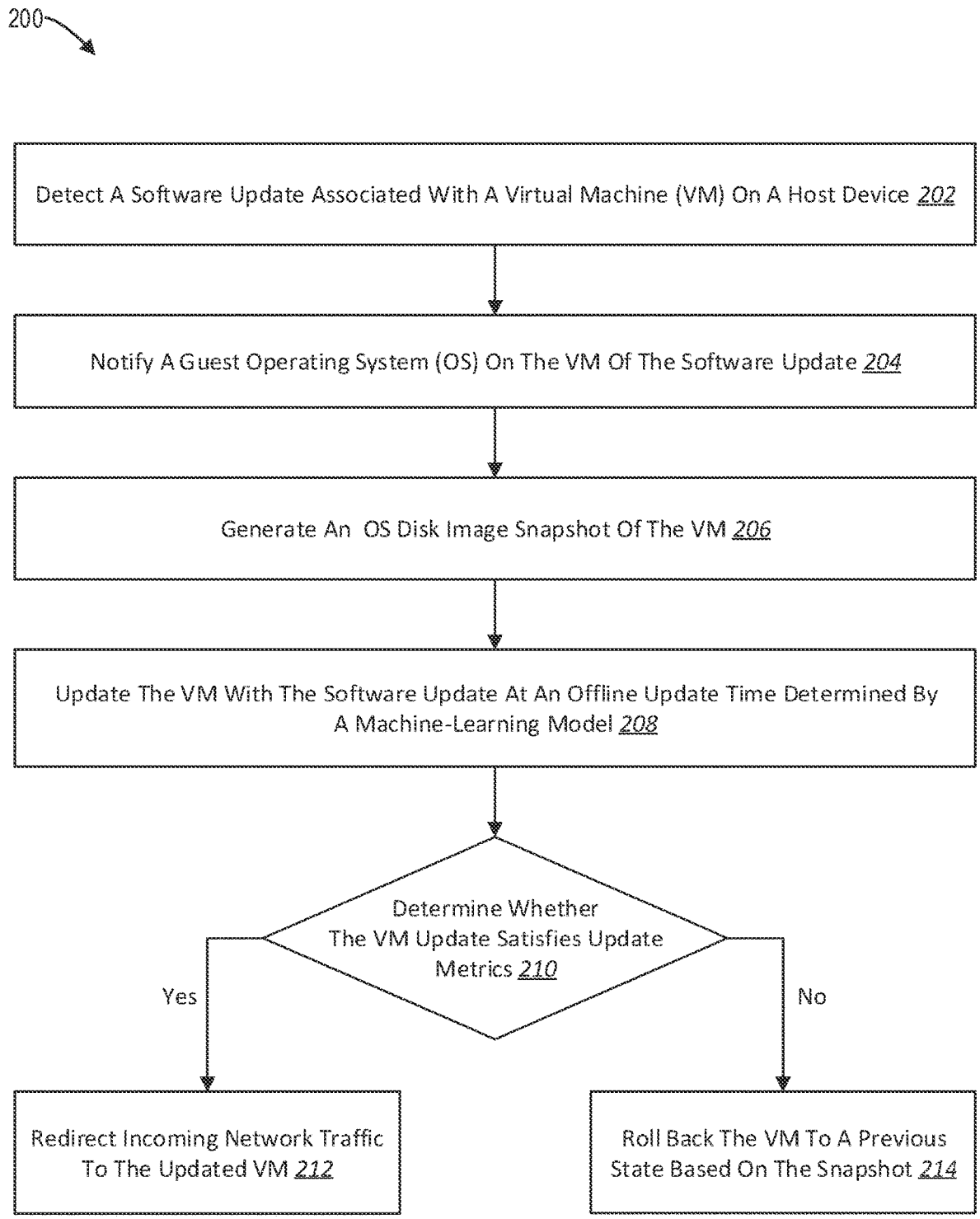
FIG. 2 illustrates an example workflow for intelligently updating virtual machines when offline in accordance with one or more implementations.

Additional detail in connection with an example implementation of the VM update system 130 is discussed in connection with FIG. 2. For example, FIG. 2 illustrates an example workflow for intelligently updating virtual machines when offline in accordance with one or more implementations. As shown in FIG. 2 illustrates a series of acts 200 of the VM update system 130 updating virtual machines offline.

As shown in FIG. 2, the series of acts 200 includes an act 202 of detecting a software update associated with a virtual machine (VM) on a host device (e.g., a computing device such a as server device part of a server node cluster). For example, in various implementations, the VM update system 130 detects that a pending software update is available for a VM or a compute instance type associated with the VM. In some implementations, an indication of the software update is pushed to the VM update system 130. In some implementations, an indication of the software update is pulled by the VM update system 130.

As shown, the series of acts 200 also includes an act 204 of notifying a guest operating system (Guest OS) on the VM of the software update. For example, in various implementations, the update system 130 displays a notification on the VM of the pending software update, such as a popup notification, modal user interface, a badge, or a background indication. Additional detail regarding providing a notification on the VM is provided below in connection with FIG. 8.

As shown, the series of acts 200 includes an act 206 of generating an OS disk image snapshot (snapshot) of the VM. For instance, in various implementations, the VM update system 130 captures a snapshot of the VM after the VM transitions to a stable state. In one or more implementations, the VM update system 130 stores the snapshot in temporary (e.g., volatile) and/or persistent memory. Additional detail regarding generating a snapshot is provided below in connection with FIG. 3.

As shown, the series of acts 200 includes an act 208 of updating the VM with the software update at an offline update time determined by a machine-learning model. For example, in one or more implementations, the VM update system 130 utilizes a machine-learning model to determine an optimal time when the VM is deallocated by the user and/or offline to apply the software update. Additional detail regarding determining the offline update time is provided below in connection with FIGS. 7A-7B.

As shown, the series of acts 200 includes an act 210 of determining whether the VM update satisfies update metrics. For example, in various implementations, the VM update system 130 verifies that the software update was completed successfully. Further, in various implementations, the VM update system 130 verifies that the VM, apps, computing containers, or other compute instance types associated with the VM have not degraded due to the software update (e.g., a bug that affects a key app running on the VM).

In addition, the series of acts 200 includes an act 212 of redirecting incoming network traffic to the updated VM. For instance, in various implementations, the VM update system 130 determines that the updated VM is ready to resume providing services. In these implementations, the VM update system 130 can reallocate and/or reactivate the updated VM the next time it comes online for a user or entity. Further, the VM update system 130 can add the VM back to the load balancer to receive incoming network traffic and be included as a functional application and/or service provider.

Otherwise, as shown, the series of acts 200 includes an act 214 of rolling back the VM to a previous state based on the snapshot. For example, in various implementations, based on the VM not updating or performing below expectations, the VM update system 130 restores the VM to its previous state utilizing the snapshot. Additional detail regarding determining rolling back the VM is provided below in connection with FIG. 5.

Figure 3:
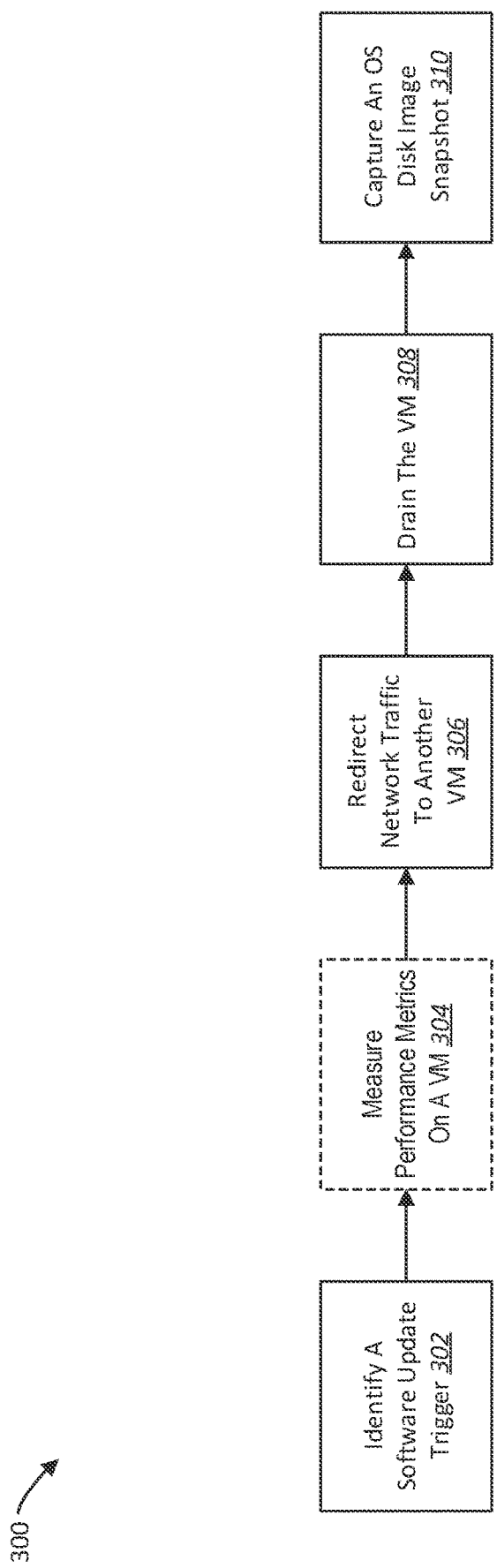
FIG. 3 illustrates a workflow of capturing a snapshot of an operating system (OS) disk image of a virtual machine in accordance with one or more implementations.

As mentioned above, FIG. 3 provides additional detail regarding generating a snapshot. In particular, FIG. 3 illustrates a workflow 300 of capturing a snapshot of an operating system (OS) disk image of a virtual machine in accordance with one or more implementations. In some implementations, the workflow 300 begins after providing a notification on the VM of the pending software update (see FIG. 8). In alternative implementations, the notification occurs during the workflow 300.

As shown, the workflow 300 includes an act 302 of identifying a software update trigger. In some implementations, the software update trigger is initiated internally, such as a shutdown trigger from the guest OS. In various implementations, the software update trigger is an external signal, such as the host device and/or orchestrator indicating to the VM to start the update process. For example, in some implementations, the confirmation of a software update notification triggers the software update. In example implementations, the VM update system 130 holds off from performing the software update and/or capturing a snapshot until the VM has requested or started deallocation.

As shown, the workflow 300 includes an optional act 304 of measuring performance metrics on a VM. For instance, in some implementations, the VM update system 130 measures various metrics of the VM to establish a performance baseline for comparison after the VM is updated. For example, the VM update system 130 measures the throughput, CPU levels, memory usages, input/output (I/O) threads, connection status, memory counts, etc. of the VM, guest OS, an app, a computing container, or other compute instance type. In certain implementations, the VM update system 130 regularly records performance update measurements of the VM, such that the measurements occur before the workflow 300 initiates. In some implementations, the VM update system 130 utilizes a set of predetermined performance metrics for the VM and/or a class of similar virtual machines.

As shown, the workflow 300 includes an act 306 of redirecting network traffic to another VM. For example, in various implementations, the VM update system 130 cordons the VM by un-scheduling the VM and/or host node from receiving network traffic (e.g., removing the VM from the load balancer). In this manner, the VM can complete processing current requests without receiving additional jobs.

As shown, the workflow 300 includes an act 308 of draining the VM. In example implementations, the VM update system 130 drains and/or fails over the VM to other VM instances to prepare the VM for the software update. For example, the VM update system 130 drains the VM by deleting various resources (e.g., containers and/or pods) and fails over by indicating one or more functions to failover to another VM instance. In some implementations, the VM update system 130 also performs a quiescing to have one or more apps ready for the snapshot.

In various implementations, the VM update system 130 performs the above acts and/or other actions to cause the VM to reach a stable state. For example, the VM update system 130 prepares the VM by clearing the volatile memory or, at least, ensuring that all relevant data in volatile memory is stored as persistent data. In this manner, a snapshot taken of the OS disk will restore the VM to have an identical throughput as before the time of the snapshot.

As shown, the workflow 300 includes an act 310 of capturing an OS disk image snapshot. For example, the VM update system 130 records the current state of the VM by freezing the writable disk at a point in time. In some implementations, the VM update system 130 modifies the rights of the OS disk to read-only to prevent future changes to the VM. In additional implementations, the VM update system 130 changes the permissions to a copy-on-write layer such that new data is stored independent of the snapshot. In various implementations, the VM update system 130 captures the snapshot to be aligned with a fault boundary (e.g., AZ, FD).

As noted above, the VM update system 130 can capture a snapshot in connection with a software update trigger (e.g., the act 302). For example, the act 310 is integrated into an OS shutdown event such that the guest OS performs the snapshot (or signals to the host device to take the snapshot of the VM) based on detecting the shutdown event. In alternative implementations, the orchestrator can be triggered to capture a snapshot after detecting a cordon and/or drain at the VM.

Indeed, as mentioned above, in various implementations, the workflow 300 can be initiated and monitored at the cloud computing system level. For example, the act of generating snapshots is tied from control plane services (e.g., the orchestrator) all the way to the host device. In some instances, host-based snapshotting allows for the VM update system 130 to utilize the control plane services to trigger the snapshot within a few milliseconds, which is a significant reduction of time over conventional systems (e.g., multiple minutes to create a restore point). Further, by acting very rapidly in capturing a snapshot, the VM update system 130 can substantially reduce the data loss.

Similarly, in some implementations, a hypervisor (e.g., cloud hosting software) on the host device can communicate with the host OS and/or guest OS to know a VM is ready to upgrade. By using external signaling and components to capture a snapshot of a VM, the snapshot process can be OS agnostic. Indeed, the VM update system 130 can capture a snapshot of any OS type and/or OS version. Further, this allows for capturing snapshots of encrypted OS disks (e.g., where the ADE key for the OS disk can be the same for the snapshot).

In various implementations, the VM update system 130 aligns the attributes of the snapshot with a VM configuration. For example, the VM update system 130 notes the capabilities, features, and expectations (e.g., throughput) of the guest OS such that these elements can be measured upon update. Further, in these implementations, the VM update system 130 compares virtual machines having similar attributes (or portions thereof) pre and post software updates. For instance, the VM update system 130 compares an updated VM with one or more VM configurations when evaluating the snapshot and/or verifies an accurate snapshot.

In one or more implementations, the VM may continue to perform services after the snapshot. In these implementations, the VM update system 130 can capture another snapshot and/or direct app-initiated writes to storage (e.g., such flat-file storage). In various implementations, the storage app-initiated writes can be the same or separate from the storage used for guest OS updates. Then, when the snapshot is restored, the VM update system 130 can link the app-initiated writes (and/or the guest OS updates) with the snapshot to ensure that no data is lost.

Figure 4:
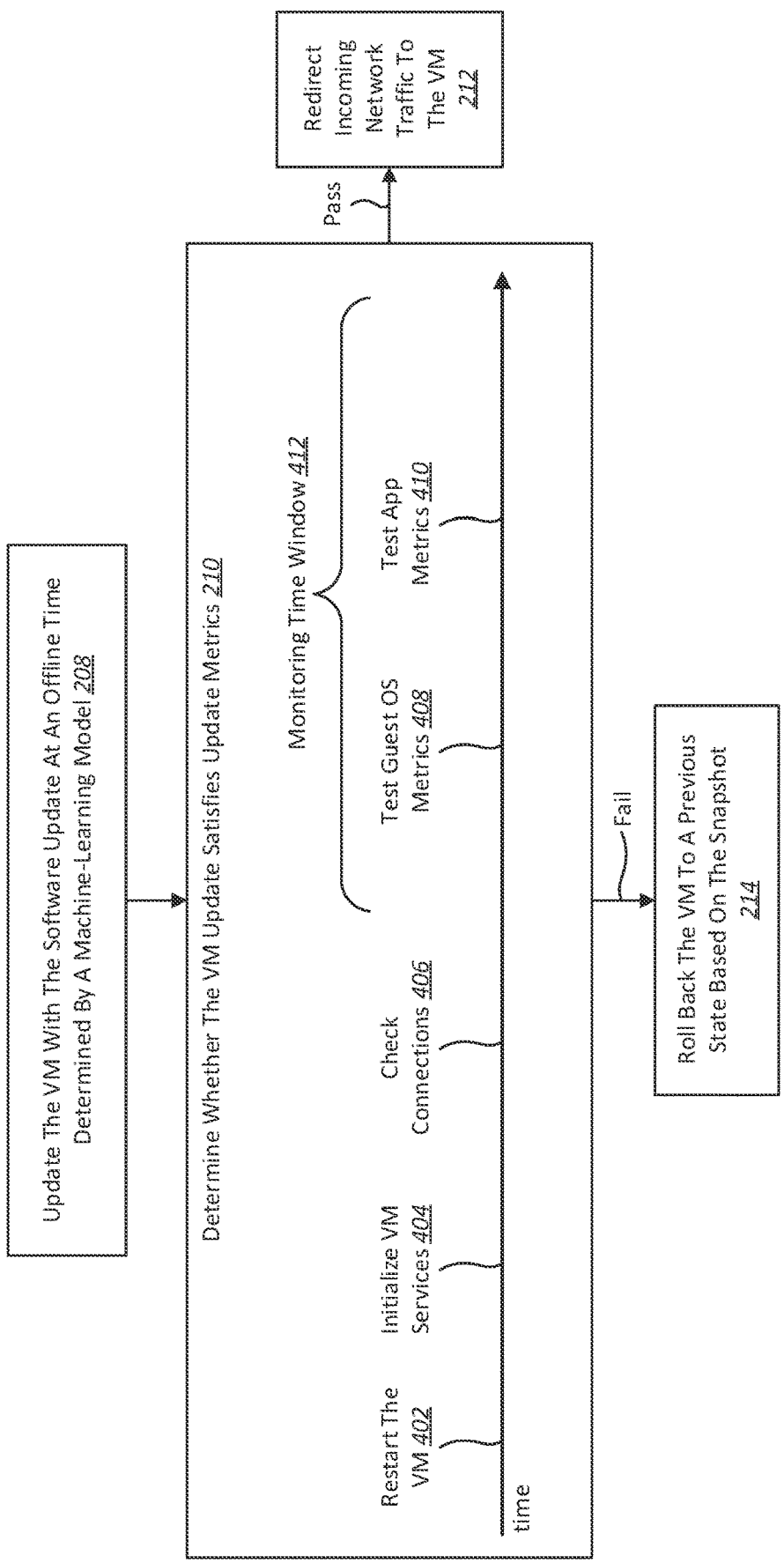
FIG. 4 illustrates determining whether a virtual machine update satisfies update metrics in accordance with one or more implementations.

As mentioned above, FIG. 4 provides additional detail regarding the VM update system 130 determining whether the VM update satisfies update metrics (e.g., update performance metrics). In particular, FIG. 4 illustrates a series of acts for the VM update system 130 to determine whether a virtual machine update satisfies update metrics in accordance with one or more implementations. As illustrated, the series of acts includes the acts 208-214 introduced above in connection with FIG. 2.

As shown, the series of acts in FIG. 4 includes the act 208 of updating the VM with the software update at an offline update time determined by a machine-learning model. As noted above, the VM update system 130 can update a VM when it is shut down, such as when the OS disk is shut down and the host device is still active.

In one or more implementations, a software update occurs and the VM performs as expected. For example, the VM maintains a similar functionality or, at least, a satisfactory level of functionality. In various instances, the software update occurs but results in a performance degradation (e.g., to the guest OS and/or one or more apps). In some instances, a software update leads to a catastrophic failure of the VM. For example, if power to a computing device is lost during a software update, the OS disk of the computing device may become corrupt and unable to boot and/or function properly. Indeed, various interruptions to a VM during an update can lead to catastrophic failure of the VM.

To illustrate, the series of acts in FIG. 4 includes the act 210 of determining whether the VM update satisfies update metrics. As shown, the act 210 can include various sub-acts that occur over time. While a particular order of sub-acts is shown, the sub-acts can occur in a different order. Also, the act 210 can include additional or fewer sub-acts.

As shown, the act 210 includes a sub-act 402 of restarting the VM. As noted above, in the event of a catastrophic failure, a VM will not restart. Other issues in the software update may also result in a failure of the VM to restart. Accordingly, if the VM does not restart, the VM update system 130 can determine that the VM update does not satisfy the update metrics. In these implementations, the VM update system 130 can proceed to the act 214 of rolling back the VM to a previous state based on the snapshot.

If the VM restarts, the VM update system 130 can proceed to the sub-act 404 of initializing VM services. For instance, the VM update system 130 can verify that services, such as apps and containers properly load on the guest OS of the VM. In addition, the VM update system 130 can verify that other services (e.g., background services) of the guest are operational. If one or more VM services fail verification, the VM update system 130 can proceed to the act 214 of rolling back the VM.

As shown, the act 210 includes a sub-act 406 of checking connections. For instance, in one or more implementations, the VM update system 130 verifies that the network and/or other connects are operational. In example implementations, the VM update system 130 verifies that particular ports of the VM are functional. In various implementations, the VM update system 130 measures the performance of one or more connections (e.g., internal connections with other virtual machines and/or server devices or external connections outside of the cloud computing system). For example, the VM update system 130 validates that network connections meet a minimum network connection threshold. As above, if one or more connections fail validation, the VM update system 130 can proceed to the act 214 of rolling back the VM.

As shown, the act 210 includes a sub-act 408 of testing guest OS metrics. For example, the VM update system 130 can perform various measurements, benchmarks, and/or tests to determine the performance level and/or health of the guest OS. In some implementations, the VM update system 130 compares the performance level of the guest OS to per-update measurements. In this manner, the VM update system 130 can validate if the updated VM is operating properly at a healthy level or suffering from errors, bugs, or other performance degrading issues.

As shown, the act 210 also includes a sub-act 410 of testing app metrics. For example, the VM update system 130 can test to determine performance levels for apps. For instance, a software update may degrade the operation of a key app while leaving other apps and/or the guest OS otherwise unaffected. In some implementations, apps include their own performance metrics and evaluation methods for testing app performance levels (e.g., after an agent software update, an agent can have its own status verification check to validate if the agent is fully functional). Additionally, the VM update system 130 can also test performance metrics and the health of other compute instance type metrics. In this manner, the VM update system 130 can isolate at which level performance issues are occurring.

As noted above, the VM update system 130 can measure and/or evaluate CPU, I/O threads, memory counters, etc. of the compute instance types (e.g., the guest OS, apps, computing containers, etc.). Further, in some implementations, the VM update system 130 compares performance trends of the VM before and after the software update.

In some implementations, the VM update system 130 compares the measured performance metrics of the VM to other similar VM. For example, the VM update system 130 compares the measured performance metrics of the VM to similar VM with similar and/or different software updates to determine the effect of the software update on the VM (e.g., if the software update improves or degrades the performance of the VM). The VM update system 130 may perform the comparison on a guest OS level, an app level, or with other compute instance types.

In various implementations, the VM update system 130 performs the sub-acts 408 and 410 at or near the same time. In various implementations, the VM update system 130 performs the sub-acts 408 and 410 for at least a monitored time window 412 (e.g., from milliseconds to seconds to minutes). Indeed, the VM update system 130 can monitor the performance level and/or health of the VM after the software update for a reasonable time period before activating the VM with real-world data. In this manner, the VM update system 130 can avoid the scenario where, post-update, an app starts to take new network traffic, write to the OS disk, then posts a latent unhealthy signal. In these implementations, a rollback to the snapshot to remedy the unhealthy app issues will result in data loss.

In various implementations, the VM update system 130 can provide one or more sets of sample, previously received, and/or mock of incoming network data to the VM to test the performance level and/or health of portions of the VM. In this manner, the VM update system 130 can fully test the performance of the updated VM without losing data. Further, by utilizing known data, the VM update system 130 can better evaluate how well the updated VM processes the test data.

As shown, if the VM update system 130 determines that the updated VM does not satisfy one or more of the update metrics, the VM update system 130 can proceed to the act 214 of rolling back the VM. Otherwise, if the updated VM satisfies the update performance metrics, the VM update system 130 can proceed to the act 212 of redirecting incoming network traffic to the updated VM (e.g., adding the VM back to a load balancer that distributes incoming network traffic to various VM instances). Indeed, upon the VM becoming reallocated and/or active, the VM update system 130 can again send incoming network traffic to it with confidence that data loss and performance degradation will not occur.

Figure 5:
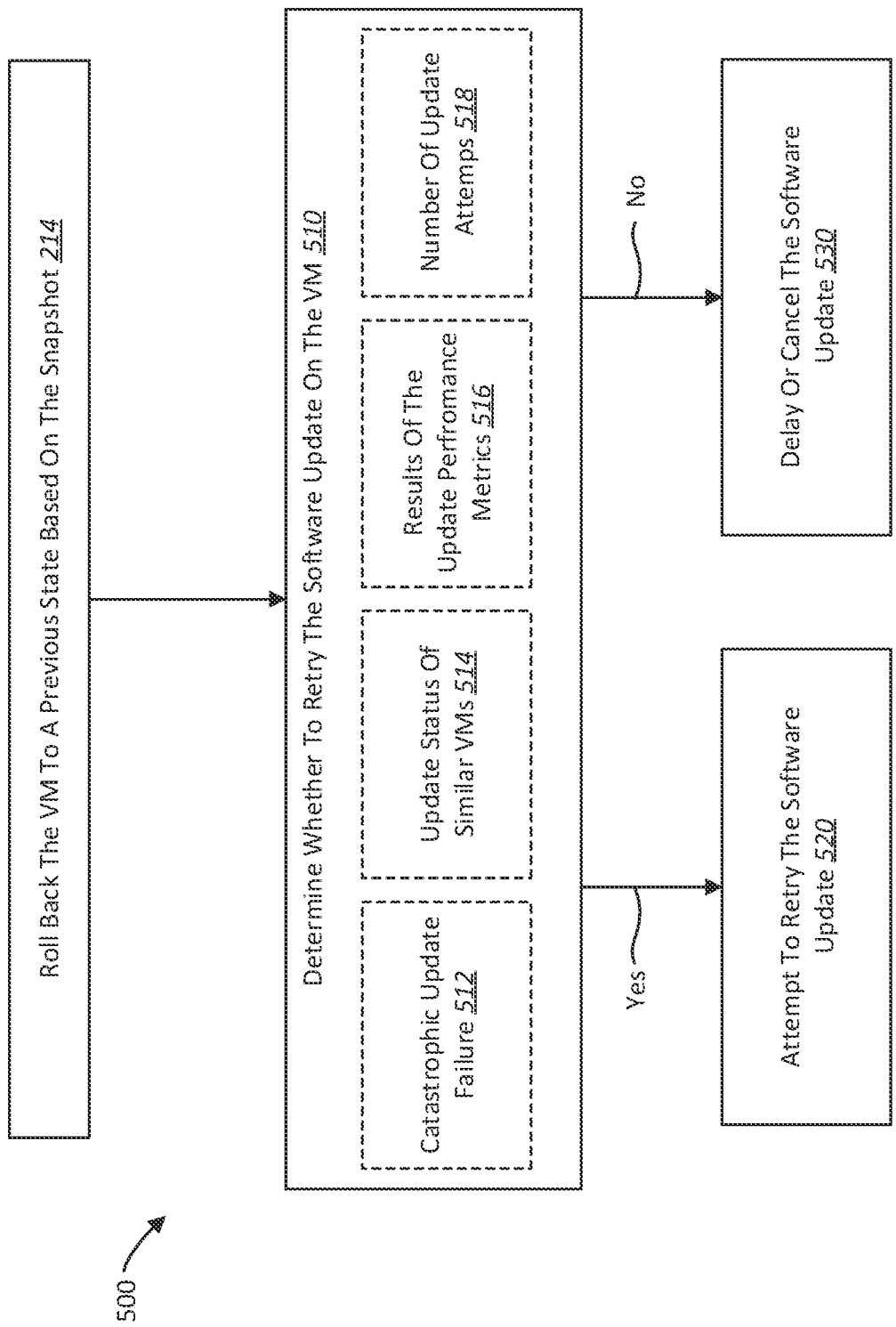
FIG. 5 illustrates determining whether to retry a software update on a virtual machine in accordance with one or more implementations.

As mentioned above, FIG. 5 provides additional detail regarding determining rolling back the VM. In particular, FIG. 5 illustrates determining whether to retry a software update on a virtual machine in accordance with one or more implementations. As shown FIG. 5 includes the act 214 of rolling back the VM to a previous state based on the snapshot (discussed above), then follows a series of acts 500 to determine whether to retry a software update.

As shown, the series of acts 500 includes an act 510 of determining whether to retry the software update on the VM. For context, in some instances, the VM update system 130 rolls back a VM due to an unsuccessful software update attempt. In other instances, an irregular error occurs that might not occur on another update attempt. Accordingly, the VM update system 130 can determine whether to again attempt the software update or, in the alternative, whether to delay or cancel the software update. Thus, as shown in connection with FIG. 5, the VM update system 130 can intelligently and automatically update virtual machines even when a first or second attempt is unsuccessful.

To further illustrate, the act 510 includes various factors that the VM update system 130 considers when determining whether to proceed with a rollback attempt. One or more of the factors can correspond to reasons why the software update failed to update. One or more of the factors can correspond to issues associated with the software update and the VM. In this manner, based on why the rollback occurred, the VM update system 130 can determine whether to attempt a software update retry. Based on the factors, the VM update system 130 can determine whether to attempt to retry the software update (shown as the act 520) or delay or cancel the software update (shown as the act 530).

As shown, one of the factors of the act 510 includes a catastrophic update failure 512. For instance, the VM was rolled back due to the VM not booting or not loading necessary services. As mentioned above, a catastrophic update failure can occur if power to the VM is lost during the update. In these cases, the VM update system 130 may weigh in favor of retrying the software update (e.g., the act 520) as catastrophic update failures are uncommon and likely not to repeat during a software update retry attempt.

Similarly, while not a catastrophic failure, the VM may have not successfully and/or fully updated. For example, during the software update, the VM throws one or more exceptions or errors. Based on the exception type, the VM update system 130 may determine whether to retry the software update on the VM (e.g., the act 520).

As shown, one of the factors of the act 510 includes the update status of similar virtual machines 514. For example, in various implementations, the VM update system 130 performs the same or similar software updates to multiple VMs. If several instances of the other VMs have updated successfully, the VM update system 130 may weigh in favor of retrying the software (e.g., the act 520). Otherwise, if multiple instances of the other VMs were also rolled back, the VM update system 130 may weigh in favor of delaying or canceling the software update (e.g., the act 530).

As shown, one of the factors of the act 510 includes the results of the update performance metrics 516. For instance, the VM update system 130 can evaluate the performance metric results to determine whether to retry the software update. In some instances, if the performance metric results indicate a guest OS or an app-specific issue, the VM update system 130 may weigh in favor of delaying or canceling the software update (e.g., the act 530). In one or more instances, the VM update system 130 may determine that the performance metric results appear abnormal, which may indicate an error in testing. In these instances, the VM update system 130 may weigh in favor of retrying the software update (e.g., the act 520).

As shown, one of the factors of the act 510 includes the number of update attempts 518. For example, if the VM update system 130 has attempted to retry the software update less than a threshold number of retry attempts, the VM update system 130 may weigh in favor of retrying the software (e.g., the act 520). Otherwise, if the VM update system 130 has attempted to retry the software update more than a threshold number of retry attempts, the VM update system 130 may determine to delay or cancel the software update (e.g., the act 530).

In attempting to retry the software update (e.g., the act 520), the VM update system 130 can perform the software update retry during the same offline time or window as previous software update attempts. In alternative implementations, the VM update system 130 waits for a later offline time to attempt the update. In some implementations, the VM update system 130 attempts a first number of software update retries during the same offline time and additional retires (if necessary) during one or more later offline times. In any of the above implementations, the VM update system 130 can utilize the machine-learning model to determine one or more offline update times to perform a software update retry.

Figure 6:
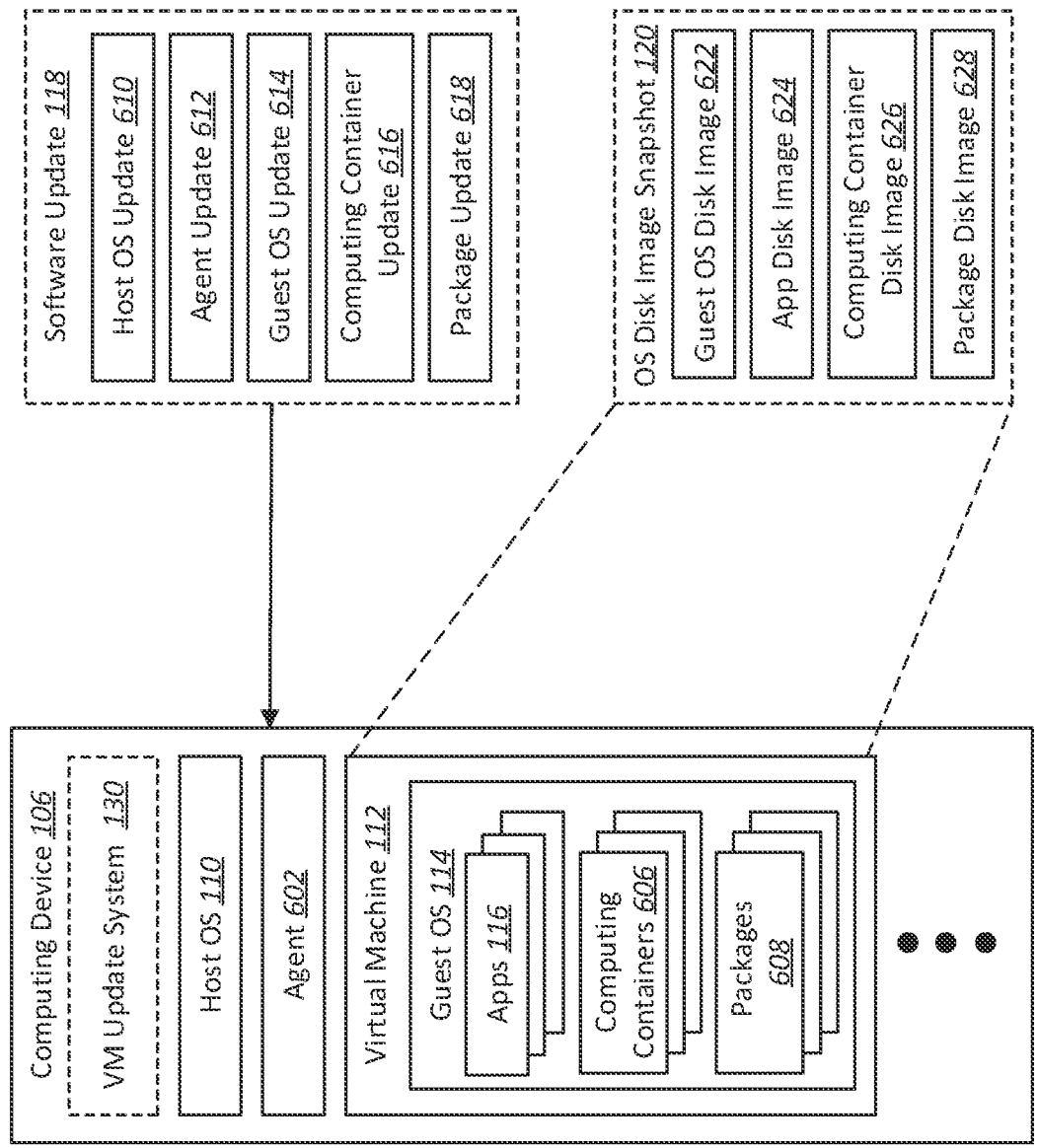
FIG. 6 illustrates updating or restoring different system levels of a virtual machine in accordance with one or more implementations.

Turning now to FIG. 6, additional detail is provided regarding generating snapshots at different system levels and/or performing rollbacks at different system levels. In particular, FIG. 6 illustrates updating or restoring different system levels of a virtual machine in accordance with one or more implementations. Indeed, in various implementations, the VM update system 130 can capture snapshots and perform rollbacks following a tiered hierarchy.

As shown, FIG. 6 includes an instance of the computing devices 106 introduced in FIG. 1. Adding to FIG. 1, the illustrated instance of the computing devices 106 also includes an agent 602. Likewise, the virtual machine 112 includes a guest OS 114 having the apps 116, as introduced above, as well as computing containers 606 and packages 608. Indeed, the guest OS 114 can include any number of compute instance types (including zero of a given instance type).

In addition, FIG. 6 includes expanded versions of the software update 118 and the OS disk image snapshot 120 introduced in FIG. 1. For example, the software update 118 in FIG. 6 includes various software updates including a host OS update 610, an agent update 612, a guest OS update 614, a computing container update 616, and a package 618. The software update 118 can include additional and/or different updates. Further, the OS disk image snapshot 120 in FIG. 6 includes various snapshots such as snapshots for a guest OS disk image 622, an app disk image 624, a computing container disk image 626, and a package disk image 628. While not shown, FIG. 6 can also include a snapshot of an agent disk image and/or host device disk image.

As noted above, in various implementations, the VM update system 130 can perform a snapshot of the particular compute instance type being updated. For example, for a computing container update 616 for a computing container of the computing containers 606, the VM update system 130 can capture a computing container disk image 626 of the computing container. After the update (e.g., an offline update), the VM update system 130 determines to perform a rollback. Rather than rolling back the entire VM, the VM update system 130 rolls back just the computing container utilizing the computing container disk image 626. In this manner, the VM update system 130 can use less memory and resources in targeting specific compute instance types that are being updated.

In various implementations, the VM update system 130 captures multiple levels of snapshots for a given software update. For example, when updating an app, the VM update system 130 captures snapshots of both the app disk image 624 and the guest OS disk image 622. After updating the app and needing to perform a rollback, if the snapshot of the app disk image 624 fails to properly restore the app, the VM update system 130 can then roll back utilizing the guest OS disk image 622. In this manner, the VM update system 130 provides tiered redundancy protection of the VM.

As mentioned above, FIGS. 7A-7B provides additional description regarding determining the offline update time. For example, the VM update system 130 can utilize a machine-learning model to determine when a VM is not in use such that the software update does not interfere with the regular operation of the VM. In particular, FIGS. 7A-7B illustrate an example of generating and utilizing a machine-learning model to determine an offline update time in accordance with one or more implementations.

Figure 7A:
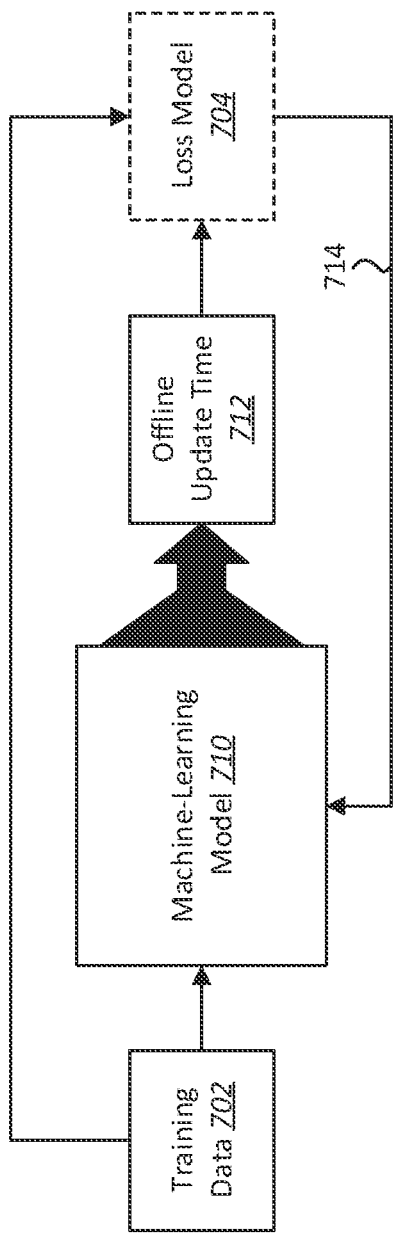
FIGS. 7A-7B illustrate an example of generating and utilizing a machine-learning model to determine an offline update time in accordance with one or more implementations.
Figure 7B:
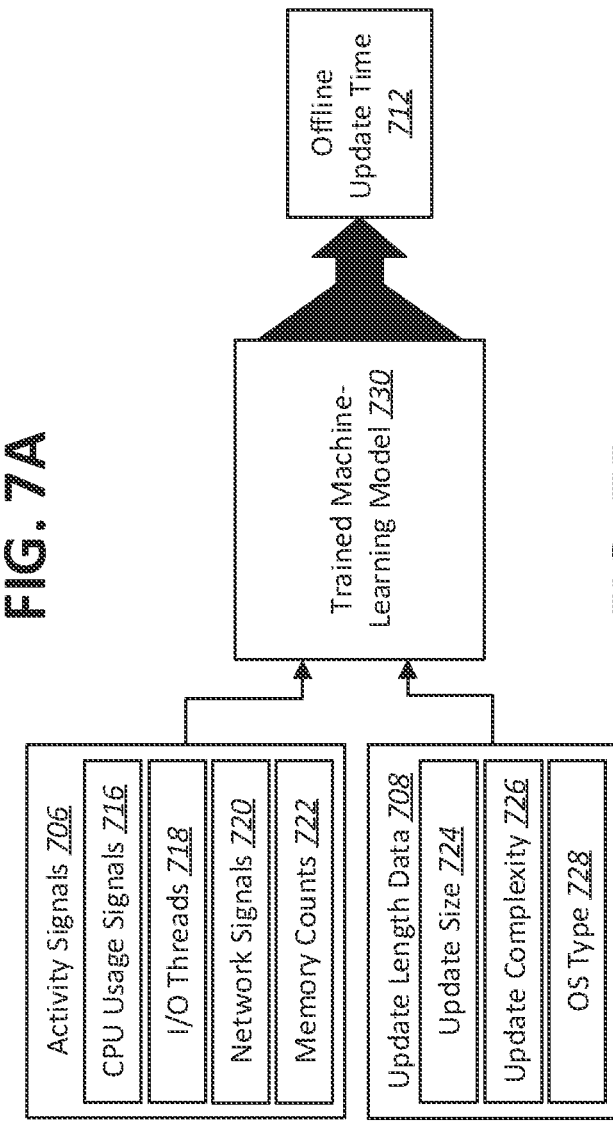

As shown, FIG. 7A includes training data 702, a machine-learning model 710, an offline update time 712, and a loss model 704. In various implementations, the VM update system 130 generates and/or trains the machine-learning model 710 by providing the training data 702 to the machine-learning model 710, which generates the offline update time 712. The VM update system 130 then utilizes the loss model 704 to compare the offline update time 712 to corresponding ground truth information from the training data 702 to determine a loss (e.g., prediction error), which is provided to the machine-learning model 710 as feedback 714. The VM update system 130 then trains and tunes the machine-learning model 710 based on the feedback 714 to generate improved offline update time predictions.

In various implementations, the training data 702 can include input data as well as ground truths. For example, the input data includes activity signals and/or update length data (examples of which are shown in FIG. 7B). Indeed, the input data can correspond to real-world data the machine-learning model 710 expects to receive when operating. Further, the ground truth can include confirmed offline update times that correspond to the input data provided to the machine-learning model 710 during training.

In general, the VM update system 130 trains the machine-learning model 710 to predict the offline update time 712 based on periods of non-use, low-use, deallocation, etc. Further, even after being initially trained, the VM update system 130 can continue to update and improve the machine-learning model 710 based on continual feedback. For example, when a predicted offline update time 712 results in a successful software update, the VM update system 130 provides positive feedback. Otherwise, when a software update is unsuccessful at the offline update time 712, the 130 provides negative feedback to the machine-learning model 710.

Once trained, the VM update system 130 utilizes a trained machine-learning model 730 to generate an offline update time 712. To illustrate, FIG. 7B shows the training data 702 from FIG. 7A is being replaced with activity signals 706 and update length data 708. As shown, the activity signals 706 include CPU usage signals 716, I/O threads 718, network signals 720, and memory counts 722. Additional activity signals 706 can include the start and stop times and patterns of a VM and/or a host device, and network traffic patterns for VMs (particularly for VMs that are rarely not in use). The update length data 708 includes characteristics of a software update such as update size 724, update complexity 726, and OS type 728.

In one or more implementations, the activity signals 706 indicates that the guest OS is performing a software update and/or is scheduled to perform a software update. In these implementations, these may be two software updates. For example, a first software update for the guest OS and/or a compute instance type on the guest OS that the user of the VM is updating and a second software update that the VM update system 130 wants to apply to the VM. In providing these activity signals 706 to the trained machine-learning model 730, the VM update system 130 may determine to delay the software update (e.g., the second software update) based on the VM undergoing a guest OS update.

In some implementations, the VM update system 130 provides an activity signals 706 of related VMs, such as "twin" VMs (duplicates of the same VM that process different incoming requests) or fault domain VMs (e.g., backups) to ensure that the VM does not undergo software update at the same time. Further, when updating an app (or other compute instance type), the VM update system 130 can provide the activity signals 706 corresponding to the app, such as network traffic patterns for the particular app.

In various implementations, the activity signals 706 include those of a host device and/or multiple VMs on the host device. In these cases, the VM update system 130 provides the activity signals 706 from multiple VMs to the trained machine-learning model 730, which generates the offline update time 712 such that each of the VMs on the host device will be minimally affected.

In one or more implementations, the activity signals 706 provide usage signals of a VM. For example, the VM update system 130 provides one or more of the activity signals 706 to the trained machine-learning model 730 for one or more VMs. In addition to using the explicit information obtained from the activity signals 706, the trained machine-learning model 730 discovers hidden or latent patterns and/or signals in predicting the offline update time 712, which may be not obvious to a user.

As shown, the VM update system 130 also provides the update length data 708 to the trained machine-learning model 730, which includes the update size 724, the update complexity 726, and the OS type 728. In various implementations, the trained machine-learning model 730 takes the length of a software update into account when determining the offline update time 712. For instance, the trained machine-learning model 730 does not want to determine an offline update time 712 that occurs just before a VM becomes active and has to wait for the software update to complete, particularly for an anticipated lengthy update. In some implementations, the trained machine-learning model 730 allows for multiple software update retries should one or more software update attempts fail.

In various implementations, a larger update size 724 and/or increased update complexity 726 may result in a longer update length. Further, in one or more implementations, updates for one type of OS (including OS versions) may take longer than a similar update for a different OS system. Accordingly, the OS type 728 may cause the trained machine-learning model 730 to predict different offline update times for software updates having different OS types (e.g., for different OS systems and/or OS versions).

As noted above, in some implementations, the trained machine-learning model 730 determines a specific update time for an update and/or an update time window. For example, if the trained machine-learning model 730 provides an update time window to the VM update system 130. In some implementations, the trained machine-learning model 730 also provides a predicted updated length to the VM update system 130. Then, the VM update system 130 coordinates between multiple VMs (e.g., on the same host device) to ensure that the VMs do not start their respective software updates at the same time, do not overlap or minimally overlap. In certain implementations, the VM update system 130 updates multiple VMs at the same time, if possible, based on the respective offline update times.

Figure 8:
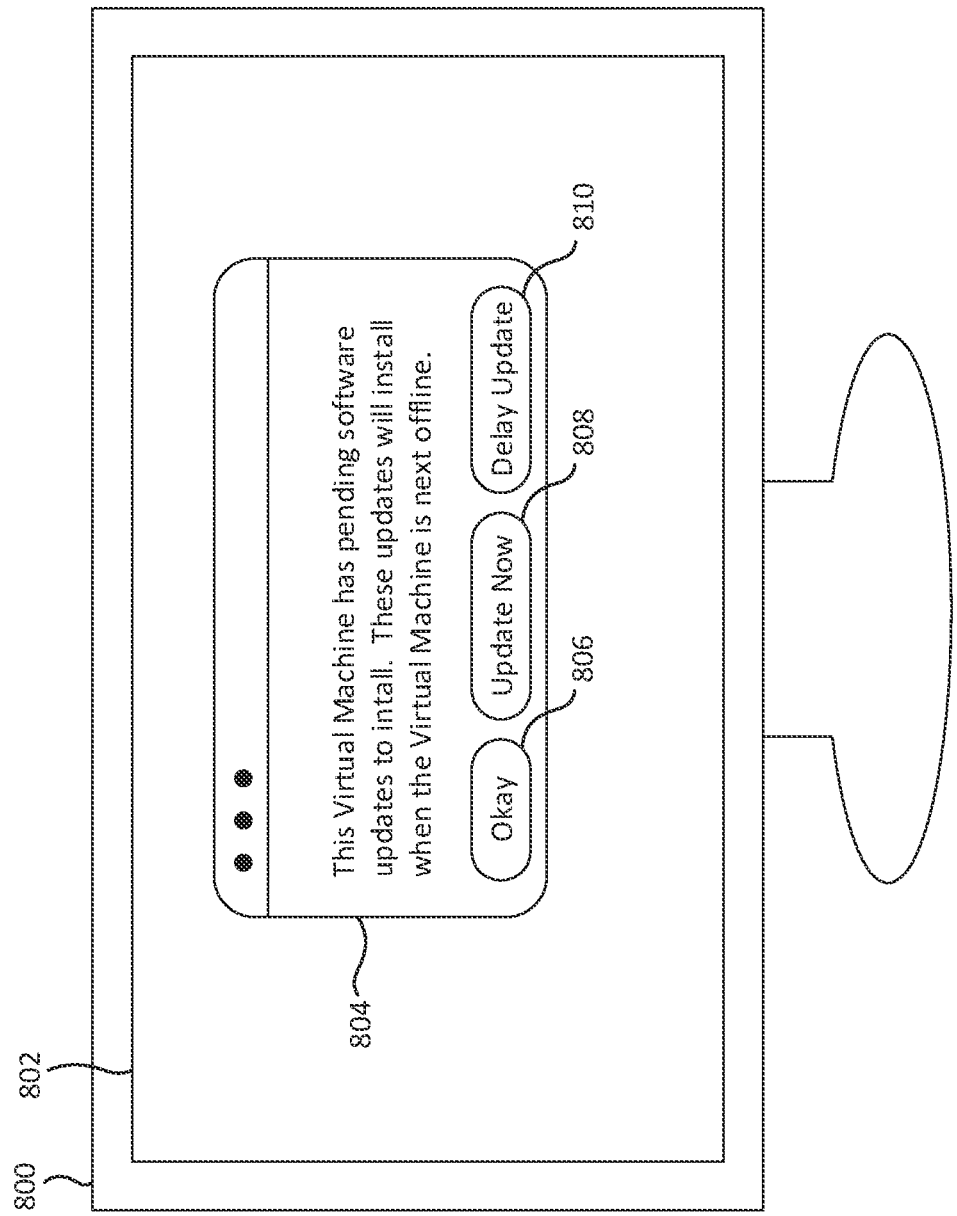
FIG. 8 illustrates an example graphical user interface for notifying a user of a pending software update on a virtual machine in accordance with one or more implementations.

As mentioned above, FIG. 8 provides additional information regarding providing a notification on the VM. In particular, FIG. 8 illustrates an example graphical user interface for notifying a user of a pending software update on a virtual machine in accordance with one or more implementations. As shown, FIG. 8 includes a computing device 800 having a graphical user interface 802. In various implementations, the computing device 800 represents a type of computing device (e.g., one of the computing devices 106, one of the client devices 124, or another computing device) that is connected to a VM (e.g., one of the virtual machines 112) on one of the computing devices 106. For example, the graphical user interface 802 displays a guest OS 114 and/or one of the apps 116 on a VM.

As shown, the graphical user interface 802 includes a notification user interface 804. In some implementations, the notification user interface 804 is a popup notification. In some implementations, the notification user interface 804 is a modal window. In one or more implementations, the notification user interface 804 is a background (e.g., non-intrusive) notification or another type of notification.

As shown, the notification user interface 804 provides a notification of a pending software update to a user. In various implementations, the VM update system 130 provides and/or causes the notification to be displayed on the notification user interface 804 to apprise of the pending software update. In some implementations, the notification provides additional details regarding the software update, such as what compute instance type to which the software update applies, a priority level of the software update, the anticipated duration of the software update, and/or the offline update time when the software update is to be applied.

As shown, the notification user interface 804 includes various selectable elements including an acceptance element 806, an update now element 808, and a delay update element 810. For example, the acceptance element 806 allows the user to acknowledge the pending update, the update now element 808 allows the user to override the update time, and the delayed update element 810 allows the user to delay the planned software update. In various implementations, the notification user interface 804 includes additional and/or different selectable options. For example, the notification user interface 804 includes an option for the user to specify a particular update time or time window (which the VM update system 130 can use as feedback in further training the machine-learning model).

By providing the notification user interface 804 notifying the user of a pending software update, the VM update system 130 can avoid performing a software update when a user is trying to deallocate a VM, as described above. Further, in providing the notification user interface 804, the VM update system 130 can facilitate a handshake with the guest OS of the VM to initiate the process of capturing an OS disk snapshot, as described above, which allows the VM update system 130 to update the VM efficiently and accurately without the loss of data or performance.

Figure 9:
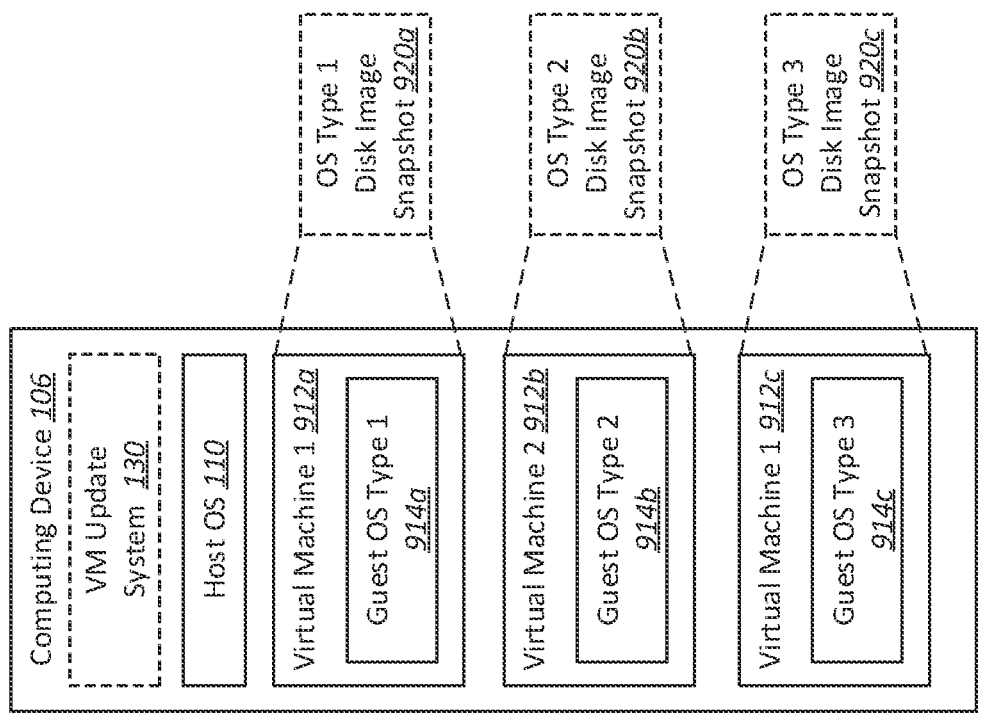
FIG. 9 illustrates intelligently updating virtual machines across various operating systems in accordance with one or more implementations.

Turning now to FIG. 9, this figure illustrates intelligently updating virtual machines across various operating systems in accordance with one or more implementations. As noted above, in many implementations, the VM update system 130 is OS agnostic. In other words, the VM update system 130 can perform similar operations regardless of which OS type or version is executing as the guest OS. In this manner, the ability to capture snapshots and roll back to previous OS states are not dependent on a specific OS type and version running on the VM. Further, as noted above, because the VM update system 130 can operate externally to the VM, the VM update system 130 can capture a snapshot very quickly (e.g., a few milliseconds).

To illustrate, FIG. 9 includes one of the computing devices 106, which are described above. The computing device 106 includes the VM update system 130, a host OS 110, and virtual machines 912a-912c (e.g., a first virtual machine 912a, a second virtual machine 912b, and a third virtual machine 912c). Each of the virtual machines 912a-912c includes corresponding guest OS types 914a-914c (e.g., a first guest OS type 914a, a second guest OS type 914b, and a third guest OS type 914c). In one or more implementations, the guest OS types 914a-914c correspond to different OS systems and/or OS versions (e.g., different versions of WINDOWS and LINUX operating systems. In some implementations, one or more of the guest OS types 914a-914c are encrypted.

In connection with the guest OS types 914a-914c, FIG. 9 shows the VM update system 130 generating corresponding OS type disk image snapshots 920a-920c (e.g., a first OS type disk image snapshot 920a, a second OS type disk image snapshot 920b, and a third OS type disk image snapshot 920c). As shown, the VM update system 130 generates a separate snapshot for each of the OS type disk image snapshots 920a-920c. In this manner, generating the snapshot is not dependent on the type of OS being captured in a snapshot.

Figure 10:
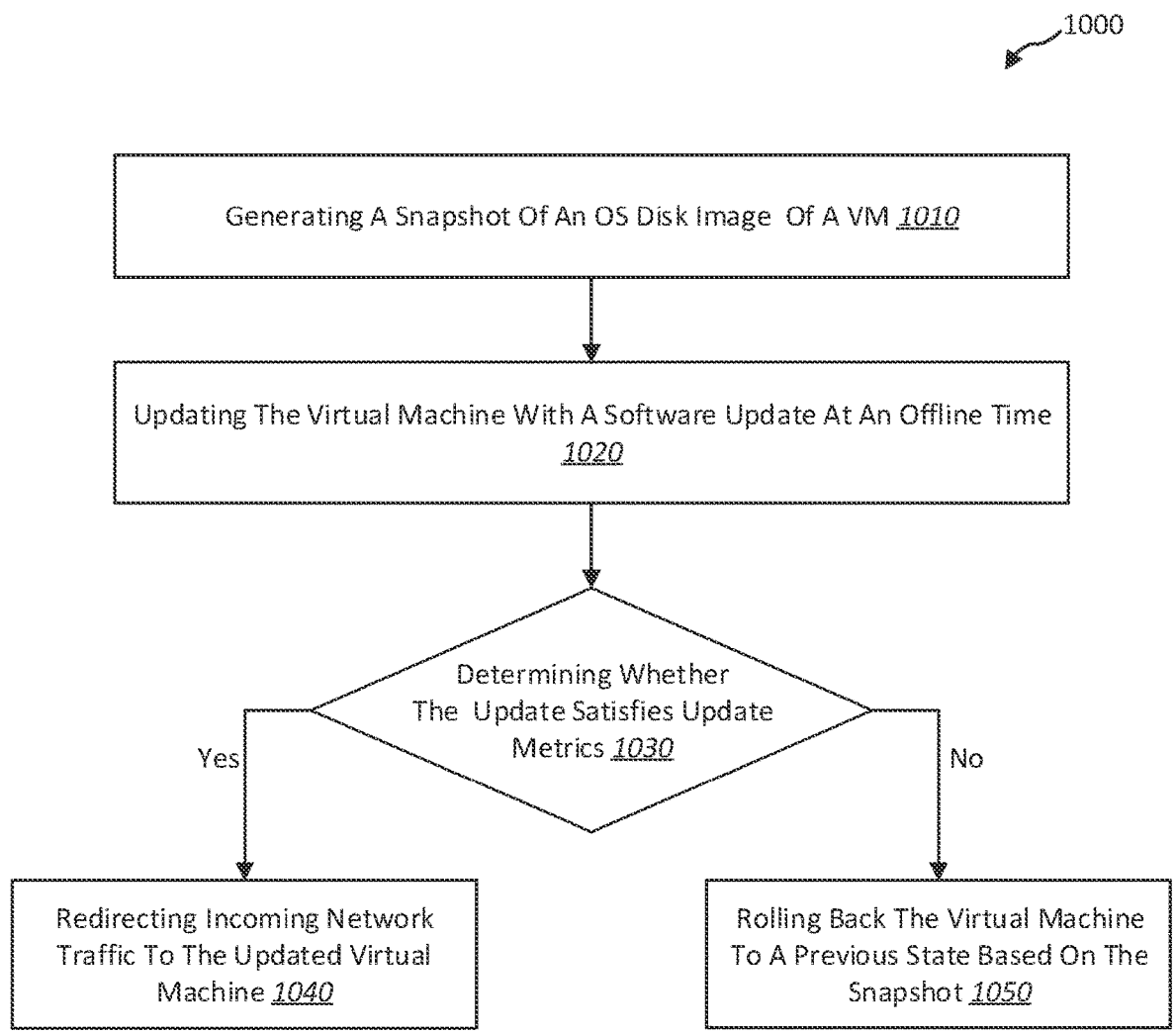
FIG. 10 illustrates an example series of acts for intelligently updating virtual machines offline with rollback protection in accordance with one or more implementations.

Turning now to FIG. 10, this figure illustrates an example flowchart including a series of acts 1000 for intelligently updating virtual machines offline with rollback protection in accordance with one or more implementations. While FIG. 10 illustrates acts according to one or more implementations, alternative implementations may omit, add to, reorder, and/or modify any of the acts shown in FIG. 10. The acts of FIG. 10 can be performed as part of a method. Alternatively, a non-transitory computer-readable medium can include instructions that, when executed by one or more processors, cause a computing device to perform the acts of FIG. 10. In still further implementations, a system can perform the acts of FIG. 10.

For example, FIG. 10 illustrates a series of acts 1000 for generating and providing a subset of indexes for and index configuration. The series of acts 1000 includes an act 1010 of generating a snapshot of an OS disk image of a VM. For instance, the act 1010 may involve generating a snapshot of an operating system disk image of a virtual machine based on detecting that a software update is update available for the virtual machine on a host device. In some implementations, the VM represents a compute instance type that includes a host device operating system or a guest operating system, a container image, a package, or an agent running on a guest operating system of a virtual machine of the host device. In example implementations, the operating system disk image is an encrypted disk image.

In one or more implementations, the act 1010 includes redirecting incoming network traffic to another virtual machine, cordoning and draining the virtual machine, and capturing the previous state of the operating system disk image of the virtual machine without capturing data in the volatile memory of the virtual machine. In various implementations, the act 1010 includes generating the snapshot of the operating system disk image by generating a copy-on-write version of the operating system disk image of the virtual machine. In some implementations, a guest operating system of the virtual machine generates the snapshot of the operating system disk image of the virtual machine. In alternative implementations, a host device generates the snapshot of the operating system disk image of the virtual machine.

As further shown, the series of acts 1000 includes an act 1020 of updating the virtual machine with a software update at an offline time. For example, the act 1020 may involve updating the virtual machine with the software update at an offline update time determined by a machine-learning model. In some implementations, the act 1020 includes utilizing the machine-learning model to determine the offline update time to update the virtual machine with the software update based on activity signals and an update length of the software update. In one or more implementations, the act 1020 includes determining the update length of the software update based on the software update, an operating system type of the virtual machine, and an operating system version of the virtual machine.

As further shown, the series of acts 1000 includes an act 1030 of determining whether the update satisfies update metrics. For example, the act 1030 may include determining whether the update of the virtual machine satisfies one or more update metrics. In various implementations, the act 1030 includes verifying that the virtual machine successfully updated with the software update, monitoring one or more signals of the virtual machine for a period of time, and determining whether the one or more signals of the virtual machine meet or exceeds performance metrics measured at the virtual machine before the update.

In one or more implementations, the act 1030 includes determining whether the update of the virtual machine satisfies the one or more update metrics includes monitoring functions and signals of the virtual machine for a period of time before redirecting the incoming network traffic to the updated virtual machine. In some implementations, the one or more update metrics include guest operating system metrics, application metrics, and/or connectivity metrics.

As further shown, the series of acts 1000 includes an act 1040 of redirecting incoming network traffic to the updated virtual machine. For example, the act 1040 may involve redirecting incoming network traffic to the updated virtual machine based on the one or more update metrics being satisfied. In additional implementations, the act 1040 includes deleting the snapshot based on the one or more update metrics being satisfied.

As further shown, the series of acts 1000 includes an act 1050 of rolling back the virtual machine to a previous state based on the snapshot. For example, the act 1050 may involve rolling back the virtual machine to a previous state based on the snapshot of the operating system disk image of the virtual machine based on the one or more update metrics not being satisfied. In some implementations, the act 1050 includes accessing the snapshot of the disk image of the compute instance type from storage. In various implementations, the act 1050 includes determining, upon rolling back the virtual machine to the previous state, to re-apply the software update based on determining that additional virtual machines similar to the virtual machine have successfully updated with the software update.

In one or more implementations, the series of acts 1000 includes additional acts. For example, in some implementations, the series of acts 1000 includes acts of providing a notification via a guest operating system of the virtual machine that the software update is available for the virtual machine and determining a response to the notification. In example implementations, the series of acts 1000 includes an act of delaying the update of the software update based on the virtual machine undergoing a guest operating system update. In various implementations, generating the snapshot and rolling back the virtual machine to the previous state based on the snapshot is independent of an operating system type of the virtual machine and/or an operating system version of the virtual machine.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the VM update system 130. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 11:
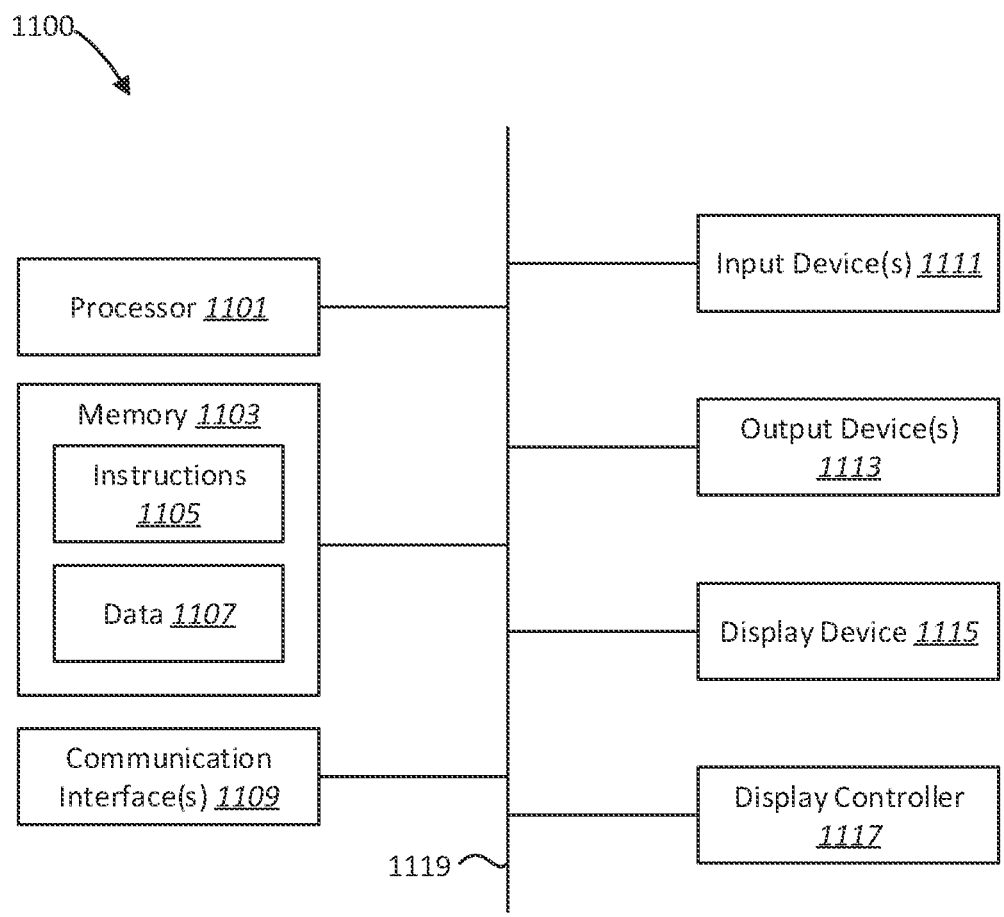
FIG. 11 illustrates certain components that may be included within a computer system.

FIG. 11 illustrates certain components that may be included within a computer system 1100. The computer system 1100 may be used to implement the various devices, components, and systems described herein.

In various implementations, the computer system 1100 may represent one or more of the client devices, server devices, or other computing devices described above. For example, the computer system 1100 may refer to various types of client devices capable of accessing data on a cloud computing system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1100 includes a processor 1101. The processor 1101 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1101 may be referred to as a central processing unit (CPU). Although the processor 1101 shown is just a single processor in the computer system 1100 of FIG. 11, in an alternative configuration, a combination of processors (e.g., an ARM and DSP) could be used.

The computer system 1100 also includes memory 1103 in electronic communication with the processor 1101. The memory 1103 may be any electronic component capable of storing electronic information. For example, the memory 1103 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 1105 and the data 1107 may be stored in the memory 1103. The instructions 1105 may be executable by the processor 1101 to implement some or all of the functionality disclosed herein. Executing the instructions 1105 may involve the use of the data 1107 that is stored in the memory 1103. Any of the various examples of modules and components described herein may be implemented, partially or wholly, as instructions 1105 stored in memory 1103 and executed by the processor 1101. Any of the various examples of data described herein may be among the data 1107 that is stored in memory 1103 and used during the execution of the instructions 1105 by the processor 1101.

A computer system 1100 may also include one or more communication interface(s) 1109 for communicating with other electronic devices. The one or more communication interface(s) 1109 may be based on wired communication technology, wireless communication technology, or both. Some examples of the one or more communication interface(s) 1109 include a Universal Serial Bus (USB), an Ethernet adapter, a wireless adapter that operates in accordance with an Institute of Electrical and Electronics Engineers (IEEE) 1102.11 wireless communication protocol, a Bluetooth® wireless communication adapter, and an infrared (IR) communication port.

A computer system 1100 may also include one or more input device(s) 1111 and one or more output device(s) 1113. Some examples of the one or more input device(s) 1111 include a keyboard, mouse, microphone, remote control device, button, joystick, trackball, touchpad, and light pen. Some examples of the one or more output device(s) 1113 include a speaker and a printer. a specific type of output device that is typically included in a computer system 1100 is a display device 1115. The display device 1115 used with implementations disclosed herein may utilize any suitable image projection technology, such as liquid crystal display (LCD), light-emitting diode (LED), gas plasma, electroluminescence, or the like. A display controller 1117 may also be provided, for converting data 1107 stored in the memory 1103 into text, graphics, and/or moving images (as appropriate) shown on the display device 1115.

The various components of the computer system 1100 may be coupled together by one or more buses, which may include a power bus, a control signal bus, a status signal bus, a data bus, etc. For the sake of clarity, the various buses are illustrated in FIG. 11 as a bus system 1119.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method for managing a cloud computing system, comprising:
generating a snapshot of an operating system disk image of a virtual machine based on detecting a software update available for the virtual machine on a host device, wherein generating the snapshot includes isolating the virtual machine and capturing a previous state of the operating system disk image of the virtual machine in a persistent memory of the virtual machine;
updating the virtual machine with the software update at an offline update time determined by a machine-learning model;
determining whether the update of the virtual machine satisfies one or more update metrics;
based on the one or more update metrics being satisfied, redirecting incoming network traffic to the updated virtual machine; and
based on the one or more update metrics not being satisfied, rolling back the virtual machine to the previous state based on the snapshot of the operating system disk image of the virtual machine.

2. The computer-implemented method of claim 1, further comprising utilizing the machine-learning model to determine the offline update time to update the virtual machine with the software update based on activity signals and an update length of the software update.

3. The computer-implemented method of claim 2, further comprising determining the update length of the software update based on the software update, an operating system type of the virtual machine, and an operating system version of the virtual machine.

4. The computer-implemented method of claim 1, wherein generating the snapshot of the operating system disk image comprises:
redirecting incoming network traffic to another virtual machine; and
wherein capturing the previous state of the operating system disk image of the virtual machine in the persistent memory is performed without capturing data in volatile memory of the virtual machine.

5. The computer-implemented method of claim 1, further comprising:
providing a notification via a guest operating system of the virtual machine that the software update is available for the virtual machine; and
determining a response to the notification.

6. The computer-implemented method of claim 1, wherein generating the snapshot of the operating system disk image comprises generating a copy-on-write version of the operating system disk image of the virtual machine.

7. The computer-implemented method of claim 1, wherein the operating system disk image is an encrypted disk image.

8. The computer-implemented method of claim 1, wherein generating the snapshot and rolling back the virtual machine to the previous state based on the snapshot is independent of an operating system type of the virtual machine.

9. The computer-implemented method of claim 1, wherein a guest operating system of the virtual machine generates the snapshot of the operating system disk image of the virtual machine.

10. The computer-implemented method of claim 1, wherein determining whether the update of the virtual machine satisfies the one or more update metrics comprises:
verifying that the virtual machine successfully updated with the software update;
monitoring one or more signals of the virtual machine for a period of time; and
determining whether the one or more signals of the virtual machine meets or exceeds performance metrics measured at the virtual machine before the update.

11. The computer-implemented method of claim 1, further comprising determining, upon rolling back the virtual machine to the previous state, to retry the software update based on determining that additional virtual machines similar to the virtual machine have successfully updated with the software update.

12. A system comprising:
at least one processor;
memory in electronic communication with the at least one processor; and
instructions stored in the memory that, when executed by the at least one processor, cause the system to:
generate a snapshot of an operating system disk image of a virtual machine based on detecting a software update available for the virtual machine on a host device, wherein generating the snapshot includes isolating the virtual machine and capturing a previous state of the operating system disk image of the virtual machine in a persistent memory of the virtual machine;
update the virtual machine with the software update at an offline update time determined by a machine-learning model based on activity signals and an update length;
determine whether the update of the virtual machine satisfies one or more update metrics;
based on the one or more update metrics being satisfied, redirect incoming network traffic to the updated virtual machine; and
based on the one or more update metrics not being satisfied, roll back the virtual machine to the previous state based on the snapshot of the operating system disk image of the virtual machine.

13. The system of claim 12, wherein determining whether the update of the virtual machine satisfies the one or more update metrics comprises monitoring functions and signals of the virtual machine for a period of time before redirecting the incoming network traffic to the updated virtual machine.

14. The system of claim 12, wherein the one or more update metrics comprise guest operating system metrics, application metrics, and/or connectivity metrics.

15. The system of claim 12, further comprising instructions that, when executed by the at least one processor, cause the system to delete the snapshot based on the one or more update metrics being satisfied.

16. The system of claim 12, further comprising instructions that, when executed by the at least one processor, cause the system to delay the update of the software update based on the virtual machine undergoing a guest operating system update.

17. The system of claim 12, wherein generating the snapshot and rolling back the virtual machine to the previous state based on the snapshot is independent of an operating system type of the virtual machine and an operating system version of the virtual machine.

18. A computer-implemented method for managing a cloud computing system, comprising:
generating a snapshot of an operating system disk image of a compute instance type based on detecting a software update available for the compute instance type on a host device, wherein generating the snapshot includes isolating the compute instance type and capturing a previous state of the operating system disk image of the compute instance type in a persistent memory of the compute instance type;
updating the compute instance type with the software update at an offline update time determined by a machine-learning model based on activity signals and a predicted update length, wherein the predicted update length is determined by the machine learning model;
determining that the update of the compute instance type does not satisfy one or more update performance metrics; and
based on the one or more update performance metrics not being satisfied:
accessing the snapshot of the disk image of the compute instance type from storage; and
rolling back the compute instance type to the previous state based on the snapshot of the disk image of the compute instance type.

19. The computer-implemented method of claim 18, wherein the compute instance type comprises a host device operating system or a guest operating system.

20. The computer-implemented method of claim 18, wherein generating the compute instance type comprises a container image, a package, or an agent running on a guest operating system of a virtual machine of the host device.

* * * * *